United States Patent
Colley et al.

(10) Patent No.: US 6,521,162 B2
(45) Date of Patent: Feb. 18, 2003

(54) LIGHTWEIGHT PARTS MOLDED AT LOW PRESSURE

(75) Inventors: Bruce Ronald Colley, Hillard, OH (US); Terry Phillip VanHyfte, Galloway, OH (US); Carl William Lakatos, Powell, OH (US)

(73) Assignee: Ashland Inc., Ashland, KY (US)

( * ) Notice: Subject to any disclaimer, the term of this patent is extended or adjusted under 35 U.S.C. 154(b) by 0 days.

(21) Appl. No.: 09/802,965

(22) Filed: Mar. 12, 2001

(65) Prior Publication Data

US 2001/0053440 A1 Dec. 20, 2001

Related U.S. Application Data

(60) Continuation of application No. 08/942,552, filed on Oct. 1, 1997, now abandoned, which is a division of application No. 08/251,889, filed on Jun. 1, 1994, now abandoned.

(51) Int. Cl.$^7$ .............................. B29C 43/02; C08J 5/04; C08L 67/06

(52) U.S. Cl. .................................... 264/322; 264/331.18
(58) Field of Search ............................. 264/322, 331.18

(56) References Cited

U.S. PATENT DOCUMENTS

| | | | | |
|---|---|---|---|---|
| 3,940,350 A | * | 2/1976 | Hess et al. ................... | 523/509 |
| 3,959,209 A | * | 5/1976 | Lake ........................... | 523/527 |
| 5,075,393 A | * | 12/1991 | Thompson ................... | 525/444 |
| 5,447,676 A | * | 9/1995 | Fukuda et al. ......... | 264/331.18 |

* cited by examiner

*Primary Examiner*—Leo B. Tentoni
(74) *Attorney, Agent, or Firm*—Connolly Bove Lodge & Hutz LLP

(57) ABSTRACT

This invention is a compression molded part useful for transportation vehicles and in construction and a process for making compression molded parts. These light weight parts are molded at pressures less than 500 psi (3.5 MPa) and are made from a sheet molding composition or bulk molding composition which incorporates a thixotrope such as fumed silica.

26 Claims, 1 Drawing Sheet

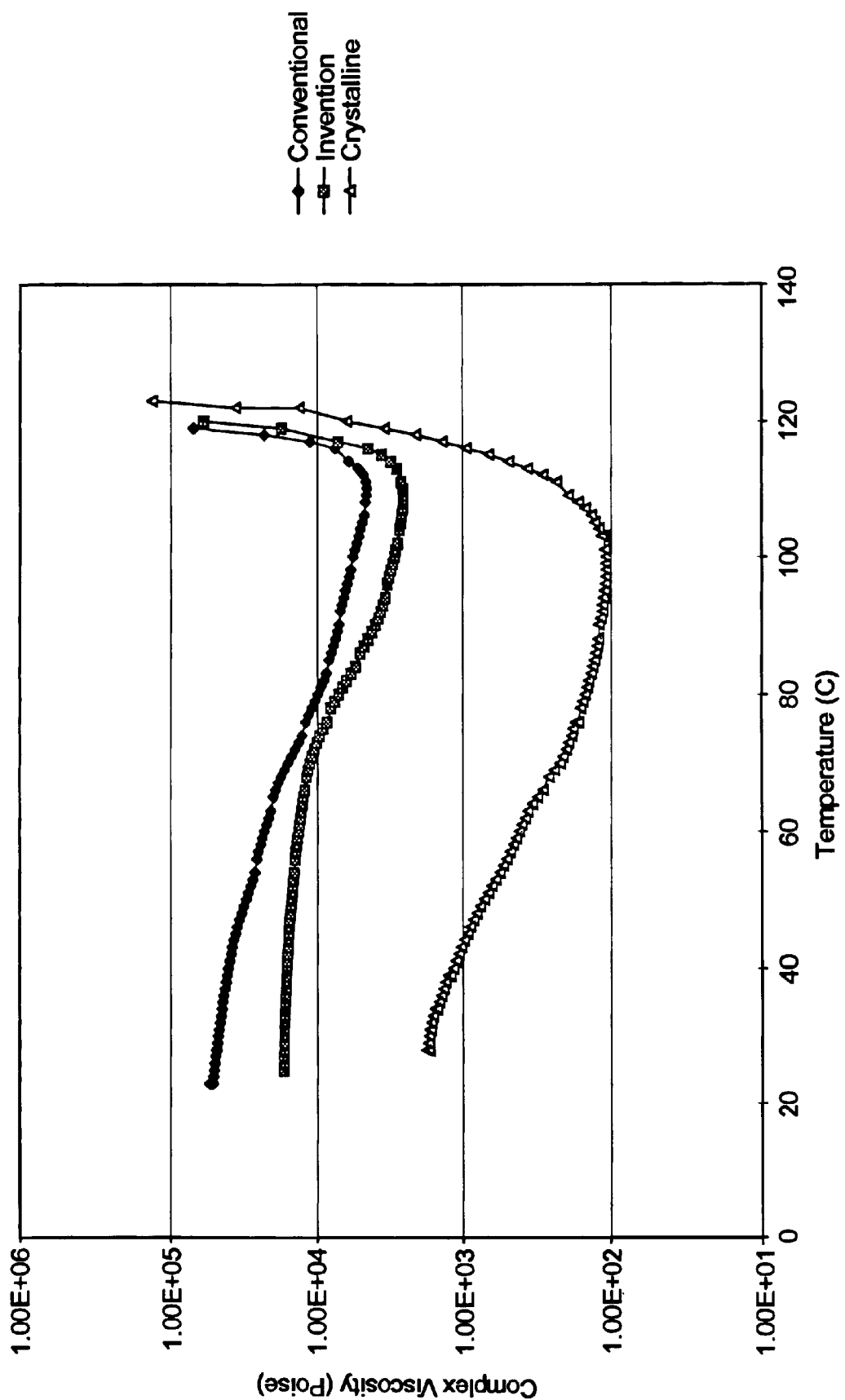

LIGHTWEIGHT PARTS MOLDED AT LOW PRESSURE

CROSS REFERENCE TO RELATED APPLICATION

This application is a continuation of application Ser. No. 08/942,552 filed Oct. 1, 1997, now abandoned, which is a divisional of U.S. patent application Ser. No. 08/251,889 filed Jun. 1, 1994, now abandoned.

FIELD OF THE INVENTION

This invention relates to molding compositions for making lightweight fiberglass reinforced parts which can be molded at low pressures in molds made of less expensive materials than the hardened steel tools needed in conventional compression molding.

BACKGROUND OF THE INVENTION

Sheet molding compound (SMC) is made from unsaturated thermosetting resins, a shrink control additive, a monomer reactive with the thermoset resin, an alkaline earth oxide or hydroxide thickening agent which forms ionic bonds with acid functionality in the resin, a mold release, an inert filler and a free radical initiator. These ingredients are applied to a chopped glass fiber mat, compacted and rolled up or festooned between cover sheets or barrier films made of polyethylene or nylon. The formed sheet is typically stored for 2 to 4 days to allow the paste component to thicken. This thickening process is also referred to as "building" viscosity or "maturing" the compound. The cover sheet is peeled off of the mature sheet to yield a tack free molding compound having a viscosity of about 15–50 million centipoise. The tack free compound is loaded into a heated press and molded at temperatures of 85° C.–170° C. under pressures of 5.5 MPa to 8.0 MPa for 0.5 to 4.0 minutes.

Large presses and costly tools are required to process conventional sheet molding compounds. According to MODERN PLASTICS (March, 1994), compression molding compound usually requires pressures of 800 psi (5.5 MPa) or more to mold parts. To accommodate these high molding pressures, hard steel tools made of P20 or 4140 grade steel are required. These tools are expensive to make relative to cast steel or composite tools. If compounds could be molded at lower pressures, less expensive tools and smaller less expensive presses could be used.

One type of low pressure molding compound is described in the U.S. Pat. No. 5,075,393 assigned to Scott Bader Company where crystalline unsaturated polyester resins which are solid at ambient temperatures, are used instead of chemical thickeners to provide the handling properties which, in conventional sheet molding compound, are provided by the ionic bonding of alkaline earth oxides with acid functionality in the resin. This use of resins which are solid at ambient temperatures requires compounding at elevated temperatures, approximately 93° C. to 100° C.

In attempts to provide resins which are moldable at low pressures, various resins have been tried which, when thickened with alkaline earth oxides, reach lower matured viscosities. Such resins behave poorly when shrink control additives are used, the molding sheets are too tacky and sticky for operators to cut and handle.

OBJECT OF THE INVENTION

It is therefore an object of this invention to develop a molding resin composition capable of molding at pressures less than 3.5 MPa. A further object of this invention is to develop a resin which can be compounded at ambient temperatures.

Another object of this invention is to develop a resin composition having good handling characteristics when in sheet form, so that the sheets are not tacky to the touch and the cover sheet or film removes readily.

A further object of this invention is to provide a sheet molding composition which, when molded into automobile parts, meets the exacting criteria required by car manufacturers such as those set forth by Chrysler Motors Corporation, Ford Motor Company and General Motors Corporation.

SUMMARY OF THE INVENTION

It has been discovered that light weight molded parts can be molded at low pressures from a molding composition containing a thixotrope such as fumed silica and, optionally, filler. The process of making the molded part of this invention includes the steps of a) admixing thermosetting resin, shrink control additive, monomer, thixotrope, such as fumed silica, free radical initiator, mold release, alkaline earth oxide or hydroxide thickening agent, b) forming a paste, c) dispensing said paste above and below a bed of chopped roving glass, d) forming a molding sheet, e) consolidating said sheet, f) enveloping said sheet in a carrier film, g) maturing said sheet until it reaches a viscosity of 3 million centipoise to 18 million centipoise measured with a Brookfield 5X HBT viscometer (TF spindle, 5 rpm, Model D Heliopath) and said sheet is non-tacky, h) releasing said sheet from said film, and i) molding said sheet at a temperature of 85 to 170° C. and at a pressure less than 500 psi (3.5 MPa) whereby a uniform flow of resin and glass occurs outward to the edges of said part.

DESCRIPTION OF THE DRAWING

The drawing is a graph of molding composition viscosity on a log scale against temperature. The diamonds are a plot of changes in the viscosity of conventional sheet molding compound on heating. The squares are a plot of the sheet molding compound of the invention incorporating thixotrope. The triangles are a plot of sheet molding compound made with crystalline unsaturated polyester resin of U.S. Pat. No. 5,075,393.

DETAILED DESCRIPTION OF THE INVENTION

Thermosetting resins useful in this invention include unsaturated polyester resins, vinyl ester resins, and urethane acrylate resins.

Unsaturated polyester resins useful to make the molded parts of this invention are prepared by a condensation reaction between various glycols and diacids, at least some of which contain a free radically-reactive double bond. Some commonly used glycols are: ethylene glycol, (1,2-ethanediol), propylene glycol(1,2-propanediol), neopentyl glycol(2,2-dimethyl-1,2-propanediol), 1,4-butanediol, 1,6-hexanediol, diethylene glycol, dipropylene glycol, and the like. Unsaturated diacids or dianhydrides include maleic acid, maleic anhydride, fumaric acid, crotonic acid, etc. Saturated diacids may include: isophthalic acid, phthalic acid, terephthalic acid, adipic acid, etc. The unsaturated polyester resins are typically prepared in a melt condensation reaction with agitation to remove water as a by-product.

The resinous unsaturated polyester resins are dissolved in a reactive solvent containing a free radically reactive double bond such as styrene, methylmethacrylate, and other mono- or multi-functional acryaltes, methacrylates, or styrenes (e.g., divinyl benzenes, ethylene glycol dimethacrylate, etc.). Diallylphthalate and other allyl containing monomers may also be used.

Shrink control additives include polyvinyl acetate, certain urethane extended polyester polyols, polystyrene, and various other thermoplastic low shrink additives well known in the industry.

Other additives such as fillers, initiators, mold release agents, thickeners, inhibitors, pigments, are also added to obtain desirable processing or material characteristics.

A thixotrope is an essential ingredient in the composition used to make the molded parts of this invention. According to the 1993 edition of the Hawley Condensed Chemical Dictionary, thixotrophy is the ability of certain colloidal gels to liquify when agitated and to return to the gel form at rest. This is observed in some clays, paints, and printing inks which flow freely on application of slight pressure, as by brushing or rolling. In Polyester Molding Compounds, Marcel Dekker, Inc., 1982, pages 12–27 at page 14, in a discussion about fillers, it is noted that "where talcs, precipitated chalk, and kaolin are used, there is a tendency to give thixotropic dispersions, which are undesirable, especially in sheet molding compounds where they make good penetration of the glass fibers extremely difficult." To the contrary, this invention uses thixotropes in SMC to make light weight parts moldable at low pressures.

Among the thixotropes useful in the composition used to make the molded part of this invention are:
  hydrophilic fumed silica,
  hydrophobic fumed silica,
  polyamide fiber,
  bentonite clay,
  polyolefin fiber,
  carbon black,
  polyester fiber, and
  wollastonite.

The preferred thixotrope used in the process of this invention is fumed silica. The fumed silica is available from Degussa Corporation, Ridgefield Park, N.J. as Aerosil 200 hydrophilic fumed silica having a BET surface area of 200±25 $m^2/g$ as measured by DIN 66131, from Cabot Corporation, Boston, Mass. as Cab-O-Sil M5 with similar characteristics, or from Wacker Chemie, Adrian, Mich. as HDK fumed silica.

In the molding industry, as described in the ASM International Engineered Materials Handbook "Composites", thickeners include calcium and magnesium oxides and hydroxides. They initiate the reaction that transforms the mixture of SMC ingredients into a handleable, reproducible, molding material. Usually 0.25 to 3.5% of the SMC formulation is thickener. It is the final ingredient added to the resin mix, and it begins the chemical thickening process immediately. Thickening agents useful in this invention are alkaline earth oxides or alkaline earth hydroxides. Magnesium oxide is the preferred thickening agent.

Optionally, fillers may be used in this invention. Useful fillers include calcium carbonate, kaolin clays, and hollow glass spheres. The preferred filler is calcium carbonate.

EXAMPLE 1

Preparation of Unsaturated Polyester Resin A

Maleic anhydride (599 parts, 6.11 moles) and propylene glycol (510 parts, 6.71 moles) were reacted at 200° C. in the presence of hydroquinone until an acid value of 30 was reached. The resulting polyester was dissolved in styrene (538 parts, 5.17 moles) containing free radical inhibitor.

Preparation of Unsaturated Polyester Resin B

Isophthalic acid (344.3 parts, 2.07 moles) and diethylene glycol (399.4 parts, 3.77 moles) were reacted at 221° C. until an acid value less than 30 was obtained. The reaction was cooled to 150° C., then ethylene glycol (74.2 parts, 1.20 moles), diethylene glycol (21.5 parts, 0.20 moles) and maleic anhydride (288.1 parts, 2.94 moles) were added. The mixture was heated at 210° C. until an acid value of 30 was obtained. The resulting polyester was dissolved in styrene containing free radical inhibitor.

EXAMPLE 2

Preparation of Shrink Control Additive

Polyol S-2011 (359 parts, a diethylene glycol adipate commercially available from RUCO, Hicksville, N.Y.) and Polyol F-203 (18.9 parts, a glycerol modified diethylene glycol adipate commercially available from RUCO) were dissolved in styrene containing free radical inhibitor (400 parts). The temperature was increased to 60° C., the dibutyltindithiolaurate (2.0 parts) and toluene diisocyanate (17.5 parts) were added to the reactor. The reaction was continued at 70° C. until no isocyanate was observed using Infrared Spectroscopy (approximately 1 hour). Maleic anhydride (3.8 parts) was added and allowed to react for 2 hours at 65° C. Additional styrene (200 parts) was added, the solution was cooled to ambient temperature.

EXAMPLE 3

Preparation of Sheet Molding Compound

This material is mixed and compounded the way conventional SMC is compounded. The process starts off in the mix area where the unsaturated polyester, monomer, and shrink control additive are added to the mixing vessel. Anywhere between 0–5.0 parts of fumed silica are added and sheared into the resin. A free radical initiator such as tert butyl peroxybenzoate (1.0–2.5 pphr) is added next. Internal mold release such as zinc stearate is added in the compound at quantities in the range of 2.0 to 8.0 pphr. Lastly and optionally, a filler such as $CaCO_3$ or clay is added into the formulation at between 0–300 pphr. This mixture is sheared until uniform dispersion and a temperature of 25–40° C. is achieved. This mixture is the A-side.

Example: Resin A-Side

| Ingredients | Parts per Hundred Resin (pphr) |
| --- | --- |
| Unsaturated Polyester Resin | 75 |
| Shrink Control Additive | 25 |

| Ingredients | Parts per Hundred Resin (pphr) |
|---|---|
| tert-butyl perbenzoate | 1.0–2.5 |
| Zinc Stearate | 2.0–8.0 |
| Fumed Silica | 0–5.0 |
| CaCO$_3$ | 0–300 |
| Alkaline Earth Oxide | 0.25–3.5 |
| Chopped Fiberglass | 100–450 |

In the compounding area, the B-side which contains an alkaline earth thickener material (0.25–3.5 pphr), monomer and a carrier resin is combined with the A-side at a ratio of 32:1. This mixture of A and B sides (which is referred to as A/B paste) is deposited into a top and bottom doctor box. The doctor boxes apply a thin layer of the A/B paste mixture onto the carrier film. Chopped glass roving is dropped onto the bottom layer of paste/film and then the top film/paste is layed on top of the glass. This sandwiched layer of A/B paste/glass/A/B paste is then ready to be wet out (encapsulate each strand of chopped glass with the A/B paste mixture) in the compaction area of the SMC machine. After compaction, the SMC sheet is then either wound into a roll or festooned into a box for maturation (allowing the material to thicken to a point where the sheet is easily handleable and able to carry glass) for 2 to 30 days. The material is ready to mold within this time frame.

The material is cut into a charge and the film is peeled off the material. The low density-low pressure sheet molding compound is placed in a heated tool (150° C.±20° C.) and the press is closed. As the press closes (final close at about 15 inches per minute) the low density-low pressure sheet molding compound fills the tool. Depending on the part, molding pressures are between 80 to 450 psi. Cure times are typically the same as for conventional sheet molding compound (0.50–4.0 minutes). The following Example 4 and Table report the experiments in which use of the fumed silica thixotrope was compared with molding of sheet molding compound lacking thixotrope.

EVALUATION OF SHEET MOWING COMPOUND (SMC)

| INGREDIENT | EXAMPLE 1 | EXAMPLE 2 | EXAMPLE 3 |
|---|---|---|---|
| Unsaturated Polyester Resin A @ 65% NV | 35.0 | 35.0 | 35.0 |
| Unsaturated Polyester Resin B @ 70% NV | 40.0 | 40.0 | 40.0 |
| Shrink Control Additive | 25.0 | 25.0 | 25.0 |
| t-butyl perbenzoate | 1.5 | 1.5 | 1.5 |
| Zinc Stearate | 4.5 | 4.5 | 4.5 |
| Fumed Silica[1] Thixotrope | 0 | 2.0 | 4.0 |
| Calcium Carbonate Filler[2] | 160 | 80 | 0 |
| B-Side Thickening Agent A[3] | 12 | 10 | 18 |
| B-Side Thickening Agent B[4] | — | — | 3 |
| 1" Chopped Fiberglass[5] | 227 | 184 | 160 |
| Ratio of Glass Content - Extreme flow side/change side[6] | 0.80 | 0.95 | 0.95 |
| Minimum Molding Pressure[7] (MPa) | 5.2 | 1.4 | 1.4 |
| Molding Viscosity[8] (MM cps) | 26.4 | 15.6 | 15.2 |
| Shrinkage (millimeter per meter) | .33 | .58 | .71 |

[1]Commercially available from Degussa Corporation as Aerosil 200 a hydrophilic fumed silica with surface area of 200 m$^2$/gram.
[2]Commercially available from Georgia Marble Inc. as a 3–8 micron particle size calcium carbonate filler.
[3]A 11% suspension of magnesium oxide in a solution of low molecular weight dipropylene glycol maleate, polyvinyl acetate and styrene.
[4]A 33% suspension of magnesium oxide in a solution of low molecular weight, low acid value dipropylene glycol maleate and styrene.
[5]Continuous roving fiberglass, available from Owens Corning Fiberglas, Toledo, Ohio, chopped to 1 inch lengths.
[6]Optimum ratio is one.
[7]Parts molded in 30.5 cm square tool with 50% mold coverage at 150° C. MPa is mega Pascals
[8]Measured with Brookfield 5XHBT viscometer (inc. Model D Heliopath) and a TF spindle at 5 rpm. MM cps is million centipoise The prepared sheet was stored at ambient temperature until viscosity in excess of 5 million centipoise was obtained before molding.

Review of the Table demonstrates that fumed silica can be used to impart additional thixotropy to molding compound paste without adversely affecting the incorporation of glass reinforcement or the flow of glass reinforcement to the edge of the part. Furthermore, these thixotropic pastes impart beneficial performance to the compound.

A surprising benefit of this invention is the ease with which low viscosity compounds can be handled. At low viscosities, conventional molding compound formulations are very tacky and the paste constituents transfer readily from the compound to the carrier film or to the users' hands. Molding compounds made by this invention do not readily transfer from the compound, even at viscosities as low as 5 MM cps. (5 million centipoise).

An additional benefit to this invention is the ability to carry reinforcement along with the flowing paste in the mold. Usually, crystalline based low pressure molding compounds and low viscosity molding compounds made using common practices do not carry reinforcement through the part evenly. Use of thixotrope in this invention provides an SMC which does carry glass reinforcement well to the edge of the part, even at low molding pressures.

We claim:

1. A process for making molded parts having a density of 0.8 to 1.85 grams per cm$^3$ and a shrinkage of less than 1 millimeter per compared with the dimensions of the cold mold, comprising the following steps:
    (a) admixing a low pressure molding compound consisting essentially of unsaturated thermosetting resin, shrink control additive, fumed silica thixotrope, free radical initiator, alkaline earth oxide or hydroxide thickening agent and monomer,
    (b) forming a paste,
    (c) dispensing said paste above and below a bed of chopped roving glass, forming a molding sheet,
    (d) consolidating said sheet,
    (e) enveloping said sheet in a carrier film,
    (f) maturing said sheet until a matured molding viscosity of 3 million to 18 million centipoises is attained and said sheet is non-tacky,
    (g) releasing said sheet from said carrier film, (h) compression molding said sheet into a part in a mold at a temperature of 85 to 170 degrees Centigrade and a pressure of 80 to 500 psi ) 0.6 to 3.5 MPa) whereby a uniform flow of resin, filler and glass occurs outward to the said part, and (i) removing said molded part, said part having shrunk less than 1 millimeter per meter in comparison with said mold.

2. The process of claim 1 wherein step a) comprises:
30 to 70 parts thermosetting polyester resin,
5 to 25 parts shrink control additive,
0.5 to 10 parts thixotrope,
1.0 to 5.0 parts free radical initiator,
0.5 to 5 parts thickening agent, and
25 to 65 parts monomer.

3. The process of claim 1 wherein the admixture of step a) comprises:
tertiary butyl perbenzoate free radical initiator
magnesium oxide thickening agent, and styrene monomer.

4. The process of claim 1 wherein the admixture of step a) comprises:
30 to 70 parts thermosetting polyester resin,
5 to 25 parts shrink control additive,
0.5 to 10 parts thixotrope,
1.0 to 5.0 parts free radical initiator,
0.5 to 5 parts thickening agent, and
25 to 65 parts monomer.

5. The process of claim 4 wherein the admixture of step a) comprises fumed silica thixotrope having a surface area less than 300 $m^2/g$,
tertiary butyl perbenzoate free radical initiator,
magnesium oxide thickening agent, and
styrene monomer.

6. The process of claim 5 wherein the admixture of step a) comprises
49 parts thermosetting resin,
16 parts shrink control additive,
42 parts styrene monomer,
2 to 4 parts fumed silica thixotrope,
2 parts free radical initiator, and
3.5 part alkaline earth thickener.

7. The process of claim 4 wherein the admixture of step a) further comprises
80 parts inert calcium carbonate filler.

8. The process of claim 6 wherein the particle size of said fumed silica thixotrope is 12 nanometers.

9. The process of claim 1, wherein compression molding step h) is at a temperature of 150±20 degrees Centigrade.

10. A process for making molded parts having a density of 0.8 to 1.85 grams per $cm^3$ and shrinkage of less than 1 millimeter per meter compared with the dimensions of the cold mold, comprising the following steps:

(a) admixing a low pressure molding compound consisting essentially of unsaturated thermosetting resin, shrink control additive, fumed silica thixotrope, free radical initiator, alkaline earth oxide or hydroxide thickening agent, and monomer, (b) forming a paste, (c) dispensing chopped roving glass into said paste, (d) mixing said glass and said paste to form a bulk molding compound mix, (e) consolidating said mix, (f) discharging said mix into a film impervious to monomer loss, (g) maturing said mix until a matured molding viscosity of 3 million to 18 million centipoises is attained and said mix is non-tacky, (h) releasing said mix from said film, (i) compression molding said mix into part in a mold at a pressure of 80 to 500 psi (0.6 to 3.5 MPa) whereby a uniform flow of resin, filler and glass occurs outward to the edges of said part, and (j) removing said molded part, said part having shrunk less than 1 millimeter per meter in comparison with the dimensions of said mold.

11. The process of claim 10 wherein the fumed silica thixotrope of step a) is hydrophilic fumed silica as sole silica containing thixotrope.

12. The process of claim 10 wherein step a) comprises:
30 to 70 parts thermosetting polyester resin,
5 to 25 parts shrink control additive,
0.5 to 10 parts thixotrope,
1.0 to 5.0 parts free radical initiator,
0.5 to 5 parts thickening agent, and
25 to 65 parts monomer.

13. The process of claim 10 wherein the admixture of step a) comprises tertiary butyl perbenzoate free radical initiator magnesium oxide thickening agent, and styrene monomer.

14. The process of claim 10 wherein the admixture of step a) further comprises 80 parts inert calcium carbonate filler.

15. The process of claim 13 wherein the admixture of step a) comprises fumed silica thixotrope having a surface area less than 300 $m^2/g$,
tertiary butyl perbenzoate free radical initiator,
magnesium oxide thickening agent, and
styrene monomer.

16. The process of claim 13 wherein the admixture of step a) comprises
49 parts thermosetting resin,
16 parts shrink control additive,
42 parts styrene monomer,
2 to 4 parts fumed silica thixotrope,
2 parts free radical initiator, and
3.5 part alkaline earth thickener.

17. The process of claim 14 wherein the particle size of said fumed silica thixotrope is 12 nanometers.

18. The process of claim 10 wherein the compression molding step h) is at a temperature of 85 to 170 degrees Centigrade.

19. The process of claim 1 which comprises molding said sheet for 0.5–4 minutes.

20. The process of claim 9 which comprises molding said sheet for 0.5–4 minutes.

21. The process of claim 10 which comprises molding said sheet for 0.5–4 minutes.

22. The process of claim 10 wherein said compression molding step h) is at a temperature of 150±200° C.

23. The process of claim 22 which comprises molding said sheet for 0.5–4 minutes.

24. The process of claim 1 wherein said maturing takes 2 to 30 days.

25. The process of claim 10 wherein said maturing takes 2 to 30 days.

26. The process of claim 10 wherein the thixotrope of step a) comprises hydrophilic fumed silica.

* * * * *

UNITED STATES PATENT AND TRADEMARK OFFICE
CERTIFICATE OF CORRECTION

PATENT NO. : 6,521,162 B2
DATED : February 18, 2003
INVENTOR(S) : Bruce R. Colley et al.

It is certified that error appears in the above-identified patent and that said Letters Patent is hereby corrected as shown below:

<u>Title page, Item [54] and Column 1, lines 1 and 2,</u>
The title is incorrect, it should read -- PROCESS OF MAKING MOLDED PARTS --

Signed and Sealed this

Twenty-ninth Day of July, 2003

JAMES E. ROGAN
*Director of the United States Patent and Trademark Office*